United States Patent
Mizuno

(10) Patent No.: US 9,912,830 B2
(45) Date of Patent: Mar. 6, 2018

(54) DATA PROCESSING APPARATUS, CONTROL METHOD, AND PROGRAM

(71) Applicant: CANON KABUSHIKI KAISHA, Tokyo (JP)

(72) Inventor: Takafumi Mizuno, Higashimurayama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/790,782

(22) Filed: Jul. 2, 2015

(65) Prior Publication Data

US 2016/0037015 A1 Feb. 4, 2016

Related U.S. Application Data

(63) Continuation of application No. 13/225,267, filed on Sep. 2, 2011, now Pat. No. 9,179,040.

(30) Foreign Application Priority Data

Sep. 9, 2010 (JP) .................................. 2010-201995

(51) Int. Cl.
*G06F 15/16* (2006.01)
*H04N 1/21* (2006.01)
*G06F 21/60* (2013.01)
*G06F 21/62* (2013.01)
*G06F 21/84* (2013.01)
(Continued)

(52) U.S. Cl.
CPC ......... *H04N 1/2179* (2013.01); *G06F 21/608* (2013.01); *G06F 21/6218* (2013.01); *G06F 21/84* (2013.01); *H04N 1/00129* (2013.01); *H04N 1/00204* (2013.01); *H04N 1/00244* (2013.01); *H04N 1/00408* (2013.01); *H04N 1/00424* (2013.01); *H04N 1/00435* (2013.01); *H04N 1/00464* (2013.01); *H04N 1/00474* (2013.01); *H04N 1/00514* (2013.01); *H04N 1/00925* (2013.01); *H04N 1/32112* (2013.01);
(Continued)

(58) Field of Classification Search
CPC ............ H04N 1/2179; H04N 1/00129; H04N 1/00204; H04N 1/00244; H04N 1/00408; H04N 1/00424; H04N 1/00435; H04N 1/00464; H04N 1/00474; H04N 1/00514; H04N 1/00; H04N 1/4413; H04N 1/444; H04N 2201/0039; G06F 21/608; G06F 21/6218; G06F 21/84
USPC ......................................................... 709/203
See application file for complete search history.

(56) References Cited

U.S. PATENT DOCUMENTS 6,301,660 B1 * 10/2001 Benson .................... G06F 21/10
                                                                380/280
7,181,445 B2 * 2/2007 Bebo .................. G06F 17/30528
(Continued)

FOREIGN PATENT DOCUMENTS

JP 2006-337613 A 12/2006
JP 2010-129028 A 6/2010

*Primary Examiner* — Melvin H Pollack
(74) *Attorney, Agent, or Firm* — Canon U.S.A., Inc. IP Division

(57) ABSTRACT

A data processing apparatus determines whether or not administrator authority of a user is set, and whether access is made locally or from the network. When the access is made locally, even if the user has the administrator authority, folders of all users are not displayed. The folders of all users are displayed only when the user having the administrator authority accesses from the network.

11 Claims, 17 Drawing Sheets

(51) Int. Cl.
*H04N 1/00* (2006.01)
*H04N 1/44* (2006.01)
*H04N 1/32* (2006.01)

(52) U.S. Cl.
CPC ........... *H04N 1/444* (2013.01); *H04N 1/4413* (2013.01); *H04N 2201/0039* (2013.01)

(56) References Cited

U.S. PATENT DOCUMENTS

| | | | | |
|---|---|---|---|---|
| 7,549,047 | B2* | 6/2009 | Balfanz | H04L 63/065 |
| | | | | 713/165 |
| 7,660,902 | B2* | 2/2010 | Graham | G06F 21/6245 |
| | | | | 709/203 |
| 7,739,379 | B1 | 6/2010 | Vahalia | G06F 17/30171 |
| | | | | 709/203 |
| 7,797,742 | B2* | 9/2010 | Sheldon | G06F 21/56 |
| | | | | 713/187 |
| 7,818,395 | B2* | 10/2010 | Pizano | G06F 21/6245 |
| | | | | 709/217 |
| 7,849,055 | B2* | 12/2010 | Banerjee | G06F 9/52 |
| | | | | 707/608 |
| 7,941,743 | B2* | 5/2011 | Reddy | G06F 17/243 |
| | | | | 358/1.15 |
| 7,958,147 | B1* | 6/2011 | Turner | G06F 21/604 |
| | | | | 707/694 |
| 7,958,148 | B2* | 6/2011 | Barnes | G06F 17/30091 |
| | | | | 707/769 |
| 8,019,849 | B1* | 9/2011 | Lopilato | G06F 17/302 |
| | | | | 709/203 |
| 8,065,357 | B2* | 11/2011 | Cocotis | H04L 29/06 |
| | | | | 358/1.15 |
| 8,078,688 | B2* | 12/2011 | Ansari | G06Q 30/04 |
| | | | | 709/203 |
| 8,116,515 | B2* | 2/2012 | Takahata | G06F 21/62 |
| | | | | 380/243 |
| 8,200,697 | B1* | 6/2012 | Kraybill | G06F 17/30165 |
| | | | | 707/783 |
| 8,204,918 | B2* | 6/2012 | Jung | G06F 17/30117 |
| | | | | 707/609 |
| 8,284,427 | B2* | 10/2012 | Iwai | H04N 1/4433 |
| | | | | 358/1.15 |
| 8,285,788 | B1* | 10/2012 | Wang | G06Q 10/107 |
| | | | | 709/203 |
| 8,320,005 | B2* | 11/2012 | Ohba | H04N 1/00204 |
| | | | | 358/1.15 |
| 8,332,464 | B2* | 12/2012 | Dispensa | H04L 29/12009 |
| | | | | 709/203 |
| 8,341,756 | B2* | 12/2012 | Kohavi | G06F 21/53 |
| | | | | 726/27 |
| 8,353,012 | B2* | 1/2013 | Del Real | G06F 21/6218 |
| | | | | 705/326 |
| 8,527,890 | B2* | 9/2013 | Harada | G06F 17/30126 |
| | | | | 707/821 |
| 8,561,146 | B2* | 10/2013 | Faitelson | G06F 21/604 |
| | | | | 726/17 |
| 8,643,893 | B2* | 2/2014 | Mori | G06F 3/1204 |
| | | | | 358/1.13 |
| 8,645,161 | B2* | 2/2014 | Lorsch | G06F 19/322 |
| | | | | 705/2 |
| 8,687,224 | B2* | 4/2014 | Ogura | G06F 3/1203 |
| | | | | 358/1.14 |
| 8,743,383 | B2* | 6/2014 | Fukuda | H04N 1/00204 |
| | | | | 358/1.14 |
| 8,799,822 | B2* | 8/2014 | Shimizu | G06F 3/0482 |
| | | | | 707/778 |
| 8,819,011 | B2* | 8/2014 | Motwani | G06F 17/30386 |
| | | | | 707/736 |
| 8,918,867 | B1* | 12/2014 | Salour | G06F 21/6245 |
| | | | | 726/22 |
| 9,019,527 | B2* | 4/2015 | Omori | H04N 1/00949 |
| | | | | 358/1.13 |
| 9,124,602 | B2* | 9/2015 | Kuehr-Mclaren | G06F 21/6218 |
| 9,135,463 | B2* | 9/2015 | Yasaki | G06F 21/554 |
| 9,213,857 | B2* | 12/2015 | O'Hare | G06F 11/1076 |
| 9,245,148 | B2* | 1/2016 | Runkis | G06F 21/6218 |
| 9,262,643 | B2* | 2/2016 | Cidon | G06F 21/6218 |
| 9,400,625 | B2* | 7/2016 | Harada | G06K 15/005 |
| 9,552,362 | B2* | 1/2017 | Borden | G06F 17/30097 |
| 2008/0079992 | A1* | 4/2008 | Lee | H04N 1/00413 |
| | | | | 358/1.15 |
| 2009/0037520 | A1* | 2/2009 | Loffredo | H04L 63/105 |
| | | | | 709/203 |
| 2010/0185614 | A1* | 7/2010 | O'Brien | G06F 17/30197 |
| | | | | 707/736 |
| 2011/0051186 | A1* | 3/2011 | Katsuda | H04N 1/00244 |
| | | | | 358/1.15 |
| 2013/0238678 | A1* | 9/2013 | Bloom | G06F 17/30203 |
| | | | | 707/827 |
| 2013/0282799 | A1* | 10/2013 | Kodama | H04L 67/10 |
| | | | | 709/203 |
| 2014/0082508 | A1* | 3/2014 | Rajashekar | H04L 69/18 |
| | | | | 715/739 |
| 2014/0358747 | A1* | 12/2014 | Meury | G06Q 20/102 |
| | | | | 705/31 |

* cited by examiner

FIG. 4

| USER NAME | PASSWORD | AUTHORITY |
|---|---|---|
| tanaka | edfv92 | GENERAL USER |
| yamada | +x#49 | ADMINISTRATOR |
| suzuki | cpqwer | GENERAL USER |
| arai | #%@095 | GENERAL USER |
|  |  |  |

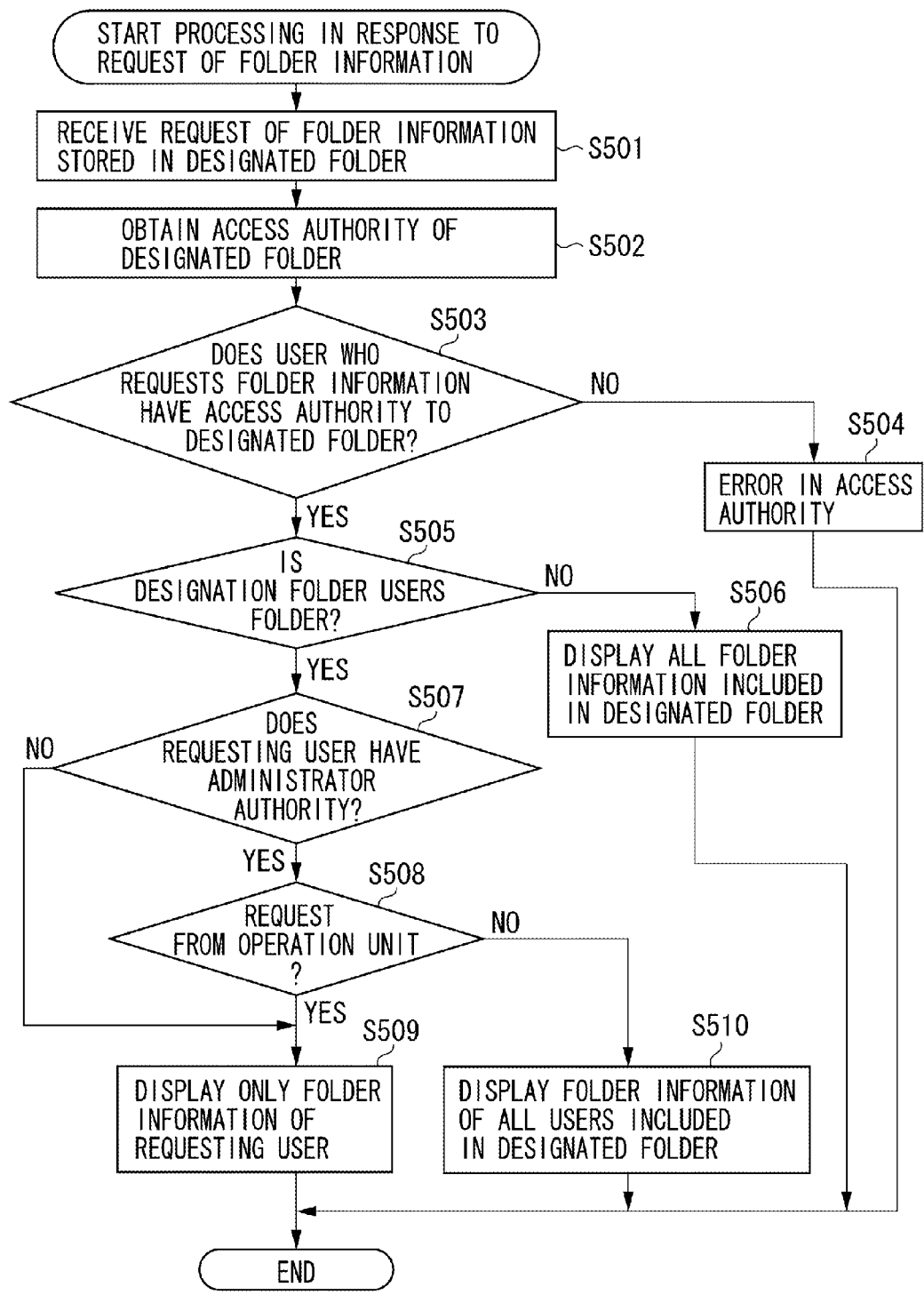

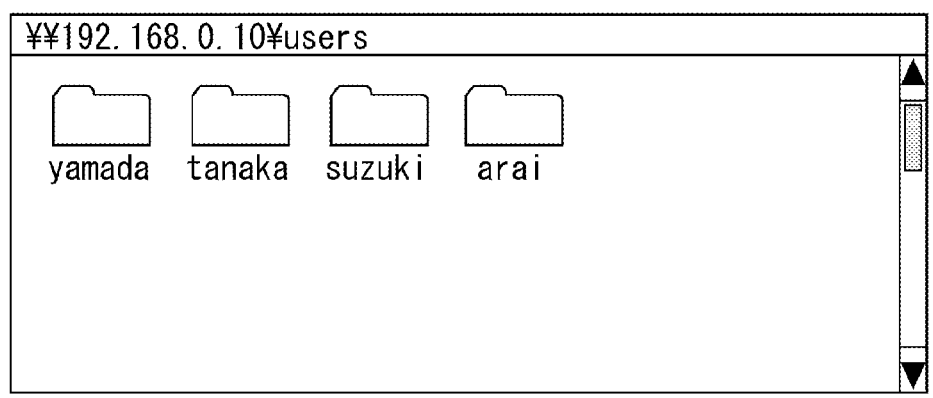

FIG. 8

/users

| TYPE | NAME | SIZE | UPDATING DATE AND TIME |
|---|---|---|---|
| 📁 | yamada | | |
| 📁 | tanaka | | |
| 📁 | suzuki | | |
| 📁 | arai | | |

1/1

GENERAL USER MODE  UP  UPDATE

FOLDER OPERATION  FILE OPERATION  SCAN  PRINT

FIG. 10A

```
1201 —— EVENT : 700_over

1202 —— user  : suzuki

1203 —— date  : 25, May, 2010, 11:25:52+0900

1204 —— path  : /users/suzuki/abc/xyz/
```

FIG. 10B

```
1205 —— EVENT : 700_over

1206 —— user  : arai

1207 —— date  : 26, May, 2010, 16:32:18+0900

1208 —— path  : /users/arai/work/
```

FIG. 10C

```
EVENT : 900_over user : arai date : 25, May, 2010, 21:50:27+0900 path : /users/arai/report/def/
```

FIG. 12A

| NAME | UPDATING DATE AND TIME | TYPE OF EVENT |
|---|---|---|
| suzuki | 2010-05-26.18:21:43 | 700_over |

FIG. 12B

| NAME | UPDATING DATE AND TIME | TYPE OF EVENT |
|---|---|---|
| suzuki | 2010-05-26.18:21:43 | 700_over |
| arai | 2010-05-25.21:50:27 | 700_over |

FIG. 12C

| NAME | UPDATING DATE AND TIME | TYPE OF EVENT |
|---|---|---|
| suzuki | 2010-05-26.18:21:43 | 700_over |
| arai | 2010-05-25.21:50:27 | 900_over |

FIG. 12D

| NAME | UPDATING DATE AND TIME | TYPE OF EVENT |
|---|---|---|
| arai | 2010-05-25. 21:50:27 | 900_over |
| suzuki | 2010-05-26. 18:21:43 | 700_over |

FIG. 12E

| NAME | UPDATING DATE AND TIME | TYPE OF EVENT |
|---|---|---|
| yamada | 2010-05-21. 08:38:41 | |
| arai | 2010-05-25. 21:50:27 | 900_over |
| suzuki | 2010-05-26. 18:21:43 | 700_over |

FIG. 13

| /users | | | |
|---|---|---|---|
| TYPE | NAME | SIZE | UPDATING DATE AND TIME |
| 📁 | yamada | | |
| 📁 | arai | | |
| 📁 | suzuki | | |

1/1

UP  UPDATE

FOLDER OPERATION   FILE OPERATION   SCAN   PRINT

DATA PROCESSING APPARATUS, CONTROL METHOD, AND PROGRAM

CROSS-REFERENCE TO RELATED APPLICATIONS

This application is a Continuation of U.S. application Ser. No. 13/225,267 filed Sep. 2, 2011 which claims priority from Japanese Patent Application No. 2010-201995 filed Sep. 9, 2010, all of which are hereby incorporated by reference herein in their entirety.

BACKGROUND OF THE INVENTION

Field of the Invention

The present invention relates to a data processing apparatus having a storage device that stores data such as a file or a folder, capable of displaying information relating to the data stored in the storage device in response to requests from a plurality of users, a control method, and a program.

Description of the Related Art

A data processing apparatus having a storage device such as a hard disk drive is generally well known. As an example of a data processing apparatus, there is a multi functional peripheral (MFP) having a scan function and a print function. The MFP performs a scan operation for storing image data, as a file, generated by scanning a document and a print operation for printing an image based on a file stored in a folder. The scan operation or the print operation in the MFP is generally instructed to be performed by a user via an operation unit provided for the MFP.

Recently, data processing apparatuses having a storage device have been operated as file servers by using a file sharing protocol such as a server message block (SMB). When a data processing apparatus is operated as a file server, easy access is realized from an external device which is connected by the Internet or local area network (LAN) to the storage device in the data processing apparatus. Further, a file can be stored in the storage device of the data processing apparatus from the external device (so a file can be transferred from an external device to the storage device of the data processing apparatus).

The data processing apparatus having the storage device is shared (accessed) by a large number of users. Therefore, the number of files or folders (hereinbelow, a file or folder is also generically referred to as an object) stored in the storage device may increase enormously. As the number of objects becomes larger it is harder to find the object, which is an operation target (so the file or folder required by the user), from a list of a plurality of objects thereby inconveniencing the user.

As discussed in Japanese Patent Application Laid-Open No. 2009-252154, when a user requests a list of objects to be displayed, all stored objects are not displayed but only an object having a relation to the user who requests a list of objects is displayed. As a consequence, the object which is the operation target is easily found from the list of a plurality of objects. Specifically, for each user access authority is set for a plurality of objects stored in the storage device. Only the objects for which the access authority has been set are displayed to the user who requests the list of objects. By preventing the display of an object having a relation to another user, only the user's required objects are displayed and the target object is easily found.

When a data processing apparatus is operated as a file server, the user having administrator authority may need to delete an unnecessary file of other users or perform maintenance such as virus check. More specifically, the user having the administrator authority needs to access not only their own objects stored in the storage device but also an object having a relation to other users. Therefore, in response to a display request from the user having the administrator authority, the objects related to other users are also displayed.

SUMMARY OF THE INVENTION

The present invention solves the following problems.

It is presumed that a user having administrator authority can also use an original function (e.g., scan or print function) of a data processing apparatus via an operation screen of the data processing apparatus. When the user having the administrator authority requests folder information using an operation unit in the data processing apparatus, for example, if not only the user's own objects but also the or each object of other users are displayed, the object which is an operation target is not easily found. Thus, referring to Japanese Patent Application Laid-Open No. 2009-252154, which discloses changing the display depending on the setting or non-setting of the access authority, the display cannot be properly switched between using the original function (e.g., scan or print function) of the data processing apparatus and using the data processing apparatus as a file server.

The present invention is directed to properly switching the display of an object depending on whether a user is capable of operating an object related to another user, and depending on whether or not a user performs an operation on an operation screen of a data processing apparatus.

According to an aspect of the present invention, a data processing apparatus having access to a storage unit includes a reception unit configured to receive a request for displaying a list of a plurality of objects stored in the storage unit, a user determination unit configured to determine whether the received request is from a user capable of operating an object related to another user, a network determination unit configured to determine whether the received request was issued using a network communication protocol, a display unit, and a control unit configured to send data corresponding to the requested list of the plurality of objects to an external device from which the request originated, in the case that the user determination unit determines that the request is from the user capable of operating the object related to the other user and the network determination unit determines that the received request was issued using a network communication protocol, and configured to select the or each object related to the requesting user from among the list of the plurality of objects and to display a list of the or each selected object on the display unit, in the case that the user determination unit determines that the request is from the user capable of operating the object related to the other user and the network determination unit determines that the received request was not issued using a network communication protocol.

According to the present invention, in the case that a user capable of operating an object related to another user requests to display a list of objects, the display of the list of objects is switched depending on the request source. Preferably, when the display is requested by an external device on a network, for example under an environment easily operable compared with the operation screen of the data processing apparatus, the object of another user can be operated. Preferably, when the display is requested via the operation unit of the data processing apparatus (so is requested locally), it is also possible for the user having the administrator authority to use the original function of the data processing apparatus without deteriorating operability.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 4 illustrates a data structure of information stored in a user database (DB) of the storage device according to the first exemplary embodiment.

FIG. 5 illustrates a flowchart of processing in response to a request of folder information in the data processing apparatus according to the first exemplary embodiment.

FIGS. 6A to 6D illustrate examples of an operation screen of an operation unit or a display device according to the first exemplary embodiment.

FIG. 8 illustrates the operation screen in the data processing apparatus displayed when a user having administrator authority requests folder information in a local access request according to the first exemplary embodiment.

FIGS. 10A to 10C illustrate events in the data processing apparatus according to the second exemplary embodiment.

FIGS. 12A to 12E illustrate examples of information of a folder list generated by the data processing apparatus according to the third exemplary embodiment.

FIG. 13 illustrates an operation screen displayed when a user having administrator authority sends a local access request for folder information.

DESCRIPTION OF THE EMBODIMENTS

Various exemplary embodiments, features, and aspects of the invention will be described in detail below with reference to the drawings.

First of all, a description is given of a configuration of a data processing system including a data processing apparatus and an external device according to the first exemplary embodiment.

Figure 1:
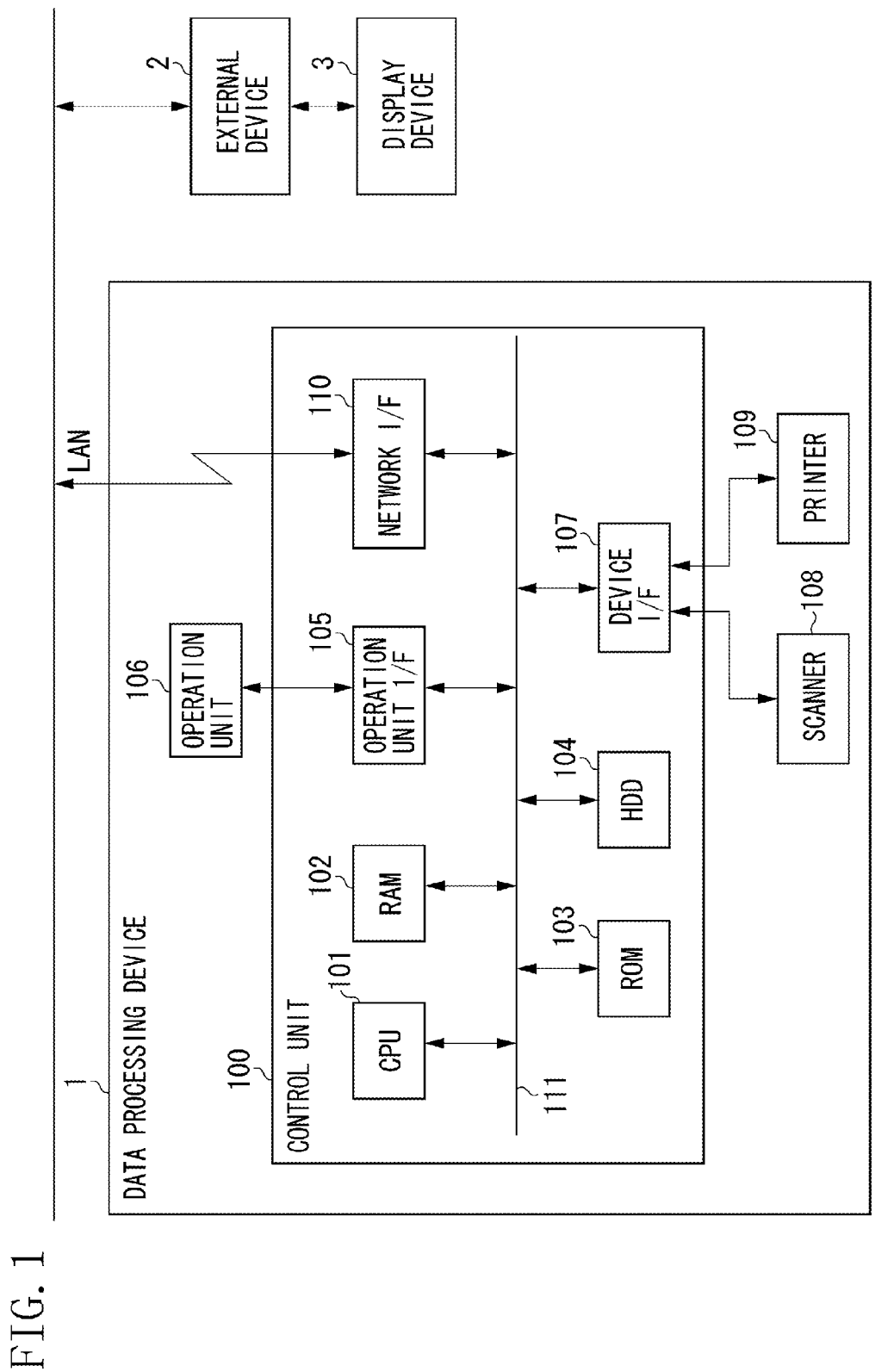
FIG. 1 illustrates a block diagram of a hardware configuration of a data processing system according to the first exemplary embodiment.

FIG. 1 illustrates a block diagram of a configuration of the data processing apparatus and the external device according to the present exemplary embodiment.

In the data processing system in FIG. 1, a data processing apparatus 1 is connected to an external device 2 via a network.

The external device 2 is a personal computer (PC), and can access the data processing apparatus 1 from outside the data processing apparatus 1.

The data processing apparatus 1 is exemplified as an image forming apparatus in the present embodiment and in particular as a multi function peripheral (MFP) having a plurality of functions from the group consisting of a scan function, a print function, a facsimile (FAX) function, and an email sending function.

A control unit 100 controls the data processing apparatus 1. A central processing unit (CPU) 101 is an arithmetic operation device that controls the entire system. A system bus 111 connects the CPU 101, a random access memory (RAM) 102, a read-only memory (ROM) 103, a hard disk drive (HDD) 104, an operation unit interface (I/F) 105, a device interface (I/F) 107, and a network interface (I/F) 110. The RAM 102 is a system work memory for operating the CPU 101, and is also an image memory for temporarily storing image data. A program such as an operating system (OS), system software, or application software is loaded to the RAM 102. The ROM 103 stores a system boot program. Further, the ROM 103 stores a system program or an application program. Moreover, the ROM 103 stores information, such as font, necessary for the data processing apparatus 1. The HDD 104 stores the OS, the system software, the application software, and the image data. According to the present exemplary embodiment, the HDD 104 includes a shared folder. The program stored in the RAM 102 is executed by the CPU 101, and processes the image data stored in the RAM 102, the ROM 103, or the HDD 104 or an execution command.

A data processing apparatus with small size may not have the HDD 104, but store the system software or application software to the ROM 103 to form a configuration without a hard disk drive. Alternatively, in place of the HDD 104, a storage device, e.g., a flash memory such as a solid state disk (SSD) may be used. In this case, the shared folder is formed in the SSD mounted on the apparatus in place of the HDD 104. The data processing apparatus 1 may be a personal computer (PC) or a server on the network.

The control unit 100 includes the operation unit I/F 105, the device I/F 107, and the network I/F 110. The operation unit I/F 105 is connected to an operation unit 106. The operation unit 106 includes a display device such as a touch panel for informing a state of the data processing apparatus 1, which is integrated with an operation button for issuing an instruction to the data processing apparatus 1. The device I/F 107 connects a scanner 108 or a printer 109 as an image input/output device to the control unit 100, and inputs or outputs the image data. The image data input via the device I/F 107 from the scanner 108 is stored in the RAM 102 or the HDD 104. The stored image data is subjected to image processing by the application program stored in the RAM 102 if necessary. When outputting the image data, the image data is output to the printer 109 via the device I/F 107. The network I/F 110 is connected to a local area network (LAN), and inputs or outputs the image data or information for controlling the data processing apparatus 1.

In the case of the data processing apparatus 1 having a facsimile (FAX) function, an interface (I/F) for a modem device (not illustrated in FIG. 1) may be provided in the control unit 100 and may be connected to a public line by a modem to enable FAX transmission.

Although not illustrated in FIG. 1, the data processing apparatus 1 may include an interface for reading data from an external storage medium such as a universal serial bus (USB) I/F, and may read and print data stored in a flash memory card.

Figure 2:
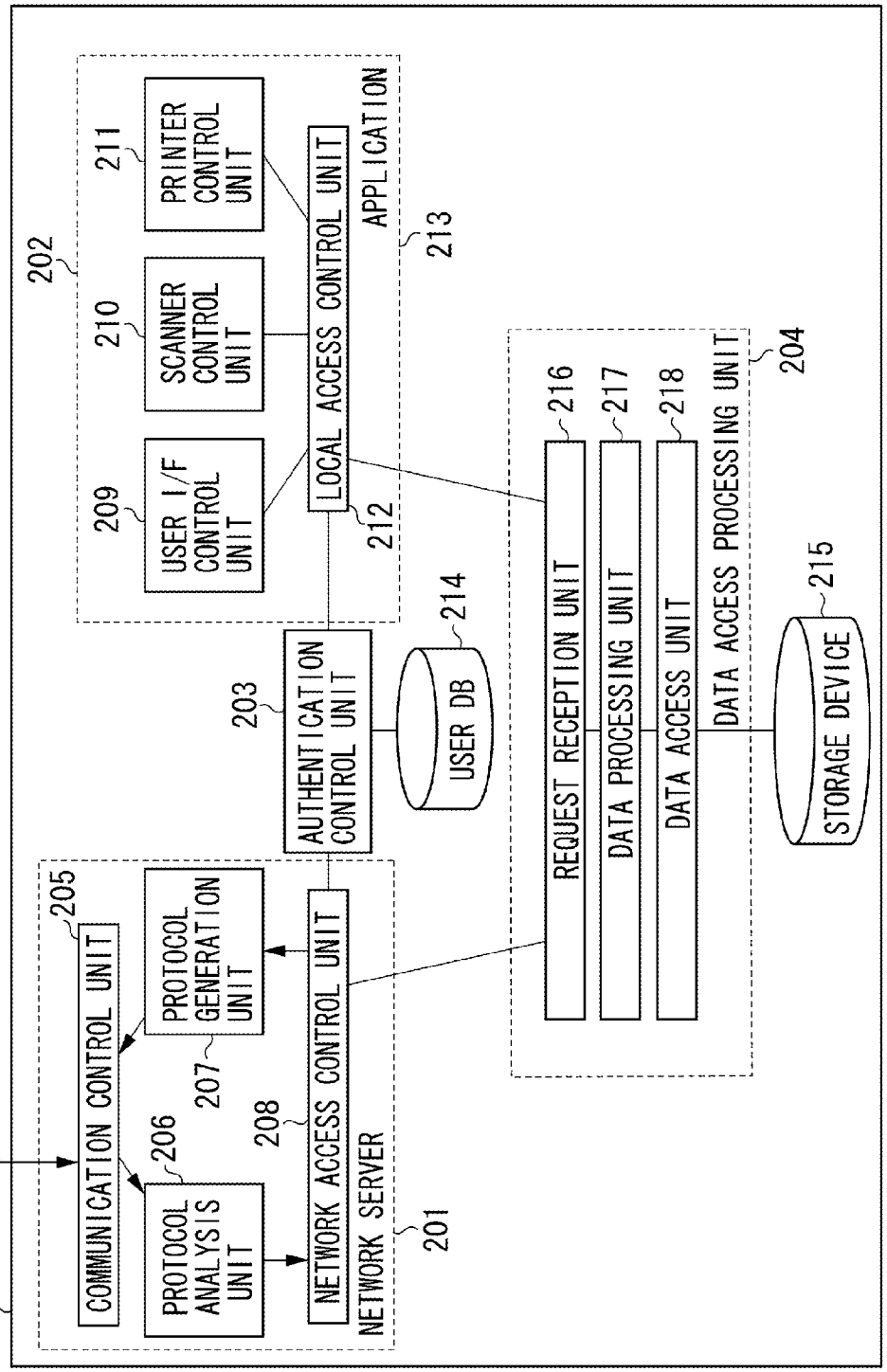
FIG. 2 illustrates a block diagram of a software configuration of a data processing apparatus according to the first exemplary embodiment.

A description is given of a software configuration of the data processing apparatus 1 according to the first exemplary embodiment with reference to FIG. 2. The data processing apparatus 1 includes a network server 201, application 213, an authentication control unit 203, and a data access processing section 204. To perform the functions, the program stored in the HDD 104 or the ROM 103 is loaded to the RAM 102 and the program is executed by the OS.

The network server 201 is a module that executes a network server function of the data processing apparatus 1. The network server function is used for accessing data stored in a storage device 215 in the data processing apparatus 1 from the external device 2 such as the PC. Further, the network server function is used for receiving packet data for printing data transmitted from the external device 2. According to the present exemplary embodiment, the storage device 215 corresponds to a part of the HDD 104. Communication with the external device 2 is performed under a protocol corresponding to a processing function. The network server 201 includes a file server function for sharing a file under a server message block (SMB) protocol to function as a file server by sharing data in the storage device 215 in the data processing apparatus 1. Specifically, the network server 201 includes a communication control unit 205, a protocol analysis unit 206, a protocol generation unit 207, and a network access control unit 208.

The communication control unit 205 receives packet data via the network I/F 110 when the apparatus is accessed from the external device 2 via the network. The communication control unit 205 determines the protocol of the received packet data, and requests the protocol analysis unit 206 to conduct an analysis. The communication control unit 205 interprets a protocol up to an underlying layer such as a transmission control protocol (TCP)/Internet Protocol (IP) or a user datagram protocol (UDP). The protocol analysis unit 206 analyzes a protocol, such as a file sharing protocol, of an upper layer of the TCP/IP. Referring to FIG. 2, although the number of the protocol analysis unit 206 is one, a protocol analysis unit may be prepared for each protocol. When a plurality of protocol analysis units is prepared, the communication control unit 205 needs to change the request destination of the analysis depending on the protocol.

The protocol analysis unit 206 analyzes a protocol type, and notifies the network access control unit 208 of an analysis result. The analysis result of the protocol analysis unit 206 includes information indicating to which module the processing is requested.

The protocol generation unit 207 notifies the communication control unit 205 of a processing result received from network access control unit 208. The network access control unit 208 requests folder information stored in the storage device 215, or accesses data in the storage device 215. The request of the folder information is a request for acquisition of information (hereinafter, simply referred to as "folder information") about a folder or a file included in a designated folder. The folder information may include for example a folder type, a folder name, data size, and information on updating date. Alternatively the request may be for acquisition of "file information" about a designated file including e.g., a file name, a file format, a creator of the file, or updating date of the file.

The data access processing section 204 writes or reads the data (e.g. files and folders) stored in the storage device 215. Further, the data access processing section 204 not only writes or reads the data, but also obtains the file information or folder information.

Specifically, the data access processing section 204 includes a request reception unit 216, a data processing unit 217, and a data access unit 218. The request reception unit 216 receives a request of the file information or folder information from the network access control unit 208 and a local access control unit 212, and sends back the file information or folder information. The data processing unit 217 checks access authority of the file or folder stored in the storage device 215, and performs access control or information processing. The data access unit 218 accesses the storage device 215, and executes the reading and writing to/from the file. Although only one storage device 215 is illustrated in FIG. 2, a plurality of the storage devices 215 can be switched depending on a storage position of the file requested from the network server 201. When data is stored in the data processing apparatus 1 thereof, the data is stored in the HDD 104. However, when data is stored in a device on an external network, the data is stored in the external device via the network I/F 110.

The authentication control unit 203 stores a user name, a password, and authority for accessing the storage device 215 in the data processing apparatus 1, in a user database (DB) 214. The authentication control unit 203 checks whether the user name and the password received from the network access control unit 208 or the local access control unit 212 are correct. When the user name and the password are correct, the authentication control unit 203 sends back the authority of the user.

The application 213 is a program module that executes the function of the data processing apparatus 1. There are various applications for functions, such as application of a copy function for copying read data and application of a function for storing the read data in the storage device 215. Referring to FIG. 2, the application is generalized as the application 213. The application 213 further includes a user interface (I/F) control unit 209, a scanner control unit 210, a printer control unit 211, and the local access control unit 212. The user I/F control unit 209 displays a screen on the operation unit 106 via the operation unit I/F 105, and receives a user operation from the operation unit 106.

The local access control unit 212 performs various processing based on the user operation received from the user I/F control unit 209, and displays the processing result on the operation unit 106 via the user I/F control unit 209. For example, when it is requested via the user I/F control unit 209 to read from the scanner 108, the scanner control unit 210 is requested to perform the reading of the document, and the document is read from the scanner 108 via the device I/F 107. When printing request is made via the user I/F control unit 209, the printing is requested to the printer control unit 211, and the printer 109 executes the printing via the device I/F 107. It is requested to the data access processing section 204 to store data which is read and generated from the scanner 108 or to obtain data to be printed by the printer 109.

The data access processing section 204 performs processing similar to that on the network server 201. When authentication is required to access the data access processing section 204, the authentication is requested to the authentication control unit 203 from the local access control unit 212. Processing of the authentication control unit 203 is similar to that on the network server 201. In FIG. 2, only the data access processing is specially illustrated and a configuration except for the network server 201 and the application 213 is not illustrated.

Figure 3:
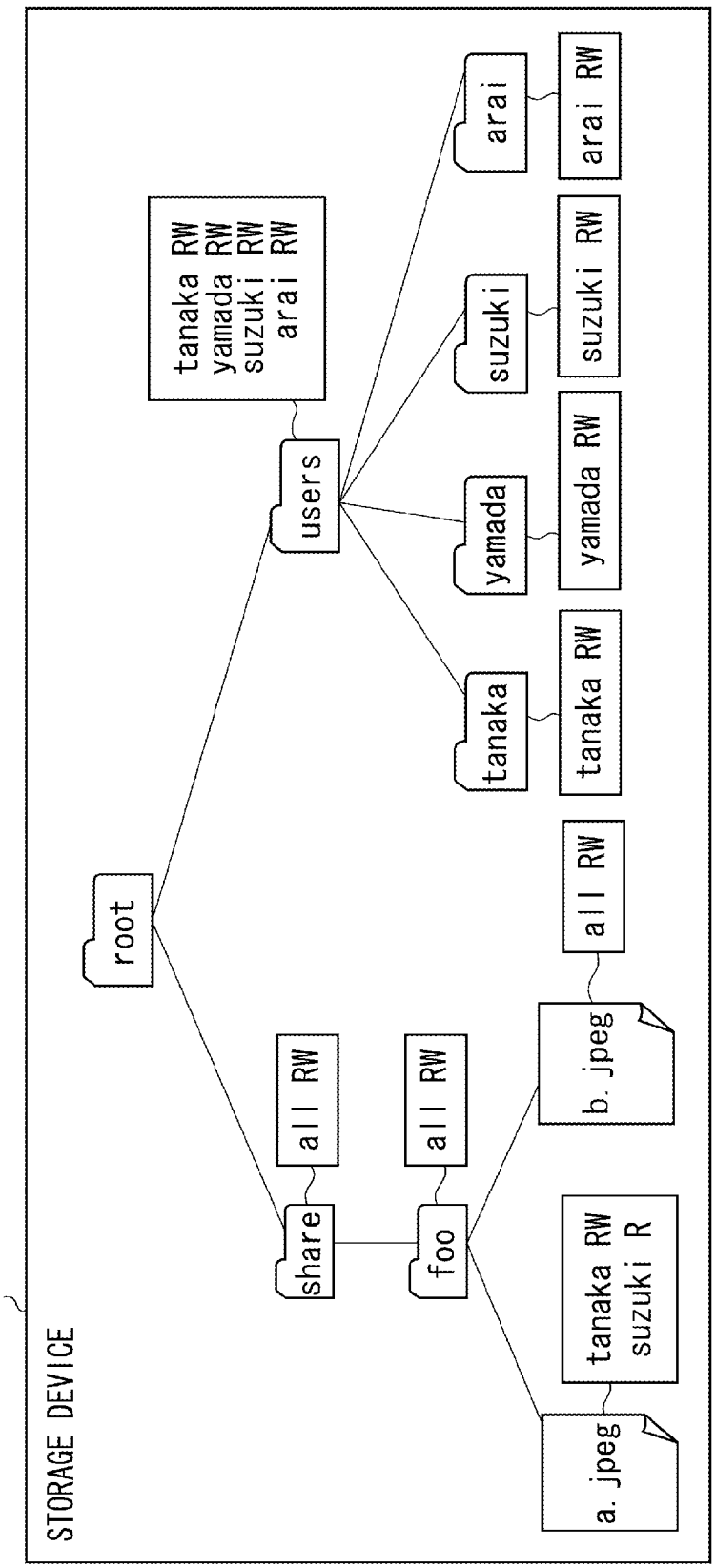
FIG. 3 illustrates a schematic diagram of access control of a file and a folder stored in a storage device according to the first exemplary embodiment.

A description will now be given of a folder structure in the storage device 215 in the data processing apparatus 1 according to the present exemplary embodiment with reference to FIG. 3. FIG. 3 schematically illustrates structures of the files and the folders included in the storage device 215. As will be understood with reference to FIG. 3, the files and the folders have a layered structure, and are stored as data in the storage device 215. Under a root folder, there are a share(d) folder and a users folder. Under the share folder, there is a foo folder. Further, under the foo folder, there are an (a.jpeg) file and a (b.jpeg) file. Just under the users folder, folders are classified in relation to users authenticated by the authentication control unit 203.

According to the present exemplary embodiment, the user DB 214 stores information on tanaka, yamada, suzuki, and arai as user names. The storage device 215 administrates a tanaka folder, a yamada folder, a suzuki folder, and an arai folder related to the user information. That is, the tanaka folder has a relation to the user tanaka. The yamada folder has a relation to the user yamada. The suzuki folder has a relation to the user suzuki. The arai folder has a relation to the user arai.

Similarly, a description is given of the access authority set to the files and the folders with reference to FIG. 3. The files and the folders stored in the storage device 215 have an access control list (ACL) for controlling the access authority of the users authenticated by the authentication control unit 203, and determines whether the user can access the file or folder according to the ACL. Specifically, access authority writable/readable (RW) from/to the user tanaka is set to the (a.jpeg) file stored in the foo folder. The access authority readable by the user suzuki is also set to the (a.jpeg) file stored in the foo folder. In other words, no user except for the user tanaka can write to the (a.jpeg) file and only users tanaka and suzuki can read the (a.jpeg) file. The access authority is set to the (b.jpeg) file for all the users.

The ACL accessible only by the individual users is set to the folders of each user stored under the users folder. Further, the ACL accessible only by the corresponding user is set also to files and folders positioned under the folders of each user. For example, to folders, /users/tanaka, the ACL accessible only by the user tanaka is set.

The ACL may be individually set to the file or folder without dividing the folders into the share folder or the users folder. FIG. 3 illustrates the share folder and the users folder. Irrespective of how the file and folder positioned under the share folder and the users folder are stored, the access authority may be properly set to the folder or file.

According to the present exemplary embodiment, as a method for access control different from the ACL, the setting or non-setting of the administrator authority is made for each authenticated user.

A general user without the administrator authority, i.e., special authority, accesses the file or folder according to the ACL. More specifically, the user who logs in and then is authenticated by the authentication control unit 203 can access only the file and folder to which the access authority is set.

On the other hand, the user with the administrator authority, in other words, the user capable of operating the folder or file relating to another user can perform an operation such as maintenance including deletion of the file in the storage device 215. The user with the administrator authority can access the file or folder, irrespective of whether or not the access authority is set by the ACL. More specifically, the user with the administrator authority can access even the data to which he has no access authority.

FIG. 4 illustrates a data structure of the information stored in the user DB 214 of the storage device 215. A description is given of the administrator authority set to each user in the user DB 214 with reference to FIG. 4. According to the present exemplary embodiment, the user yamada has the administrator authority, and other users do not have the administrator authority. The user yamada can thus also, for example, perform an operation for deleting an unnecessary file when the capacity of the storage device 215 runs short, in addition to the print operation of the file stored in the folder of the user yamada or the storage operation of the document. Since the user yamada has the administrator authority, as illustrated in FIG. 3, the user yamada can access the (a.jpeg) file although the ACL does not have a description for permitting the access of the user yamada.

According to the present exemplary embodiment, the user having the administrator authority can access the folders and files of all users. The user having the administrator authority can perform all operations (reading, writing, and deletion) on all data in the file system in FIG. 3. However, the user having the administrator authority may not necessarily be able to access the folders and files of all users, but may only be able to access the folder or file of a specific user other than him. While the user having the administrator authority cannot read contents of data, a specific operation may be performed such as deleting the data.

A plurality of different administrator authorities can be set as users. For example, the authority for performing all operations is set as the first administrator authority. Further, the authority for performing only the deletion is set as the second administrator authority and the authority for creating the folder is set as the third administrator authority. In other words, the authority for performing only a specific operation is set as the administrator authority.

A description will now be given of processing to be performed by the data processing apparatus 1 that receives a request for obtaining the folder information with reference to a flowchart in FIG. 5. A program for executing steps in the flowchart in FIG. 5 is stored in the HDD 104 or the ROM 103 of the data processing apparatus 1. Further, the program is loaded to the RAM 102, and is executed by the CPU 101.

The processing in the flowchart in FIG. 5 starts upon receiving a request for displaying the folder or the file contained in the folder designated by the user, from the external device 2 or the operation unit 106. It is assumed that the authentication control unit 203 has ended the user authentication before starting the flowchart.

In step S501, the data access processing section 204 receives the request of the folder information. According to the present exemplary embodiment, when the request of the folder information is made, information (hereinafter, simply referred to as "folder information") on the folder or the file included in the designated folder is to be obtained. The request of the folder information includes the path of the folder, the user name, the setting or non-setting of the administrator authority, and the request source. The path of the folder is information indicating the storage position of the file stored in the storage device 215. The user authenticated by the authentication control unit 203 designates the path of the folder.

The request source included in the folder information is the network access control unit 208 or the local access control unit 212. In the subsequent description, if the request is received from the network access control unit 208, the request is referred to as a "network access request". If the request is received from the local access control unit 212, the request is referred to as a "local access request".

In step S502, the data access processing section 204 checks the path of the folder included in the request of the folder information received in step S501, and obtains the access authority set to the path of the folder, from the ACL.

In step S503, the data access processing section 204 determines whether the access authority is set to the user name included in the request of the folder information received in step S501. When the data access processing section 204 determines that the access authority is not set (NO in step S503), the processing advances to step S504. In step S504, the data access processing section 204 sends back an error message notifying that the access to the designated folder is impossible, to the network access control unit 208 or the local access control unit 212 as the request source. On the other hand, when the data access processing section 204 determines that the access authority is set to the designated folder (YES in step S503), the processing proceeds to step S505. Although not illustrated, even if the access authority to the user name included in the request of the folder information is not set, in the case of the access from the user having the administrator authority, the processing advances to step S505.

In step S505, the data access processing section 204 determines whether the designated folder is the users folder by checking the path of the folder included in the request of the folder information received in step S501. When the data access processing section 204 determines that the designated folder is the users folder (YES in step S505), the processing proceeds to step S507. When the data access processing section 204 determines that the designated folder is not the users folder (NO in step S505), the processing proceeds to step S506. In step S506, the data access processing section 204 obtains all folder information (or all file information) stored just under the designated folder from the storage device 215, and sends back all folder information (or all file information) to the request source. The folder information includes a type, a name, a data size, and an updating date.

In the case of the network access request (so a request from an external device connected via a network), the network access control unit 208 transmits a packet including the folder information to the external device 2, and the display device 3 in the external device 2 displays the folder information. In the case of the local access request, the local access control unit 212 as the request source displays the folder information on the operation unit 106. As the display of the folder information, as described below, only the folder name or the folder information together with an icon may be displayed on the operation unit 106, or contents of the folder may be specifically displayed.

In step S507, the data access processing section 204 determines whether the user who requests the folder information has the administrator authority by checking the setting or non-setting of the administrator authority included in the request of the folder information received in step S501. When it is determined that the requesting user has the administrator authority (YES in step S507), the processing proceeds to step S508. When it is determined that the requesting user does not have the administrator authority, in other words, the requesting user is a general user (NO in step S507), the processing proceeds to step S509. Instep S509, the data access unit 218 checks the user name included in the request of the folder information received in step S501.

Further, the data access unit 218 selects only the folder information of the checked user to which name the access authority is set, from the storage device 215 (HDD 104), and sends back the folder information on the selected user to the request source. Therefore, when the requesting user is a general user (NO in step S507), only the folder of the requesting user is displayed on the operation unit 106 or the display device 3.

According to the present exemplary embodiment, a folder inaccessible to the general user is not displayed. Accordingly, as its effect, it is easy to find the folder as an operation target.

In step S508, the data access processing section 204 determines whether the request is a local access request or a network access request, by checking the information on the request source included in the request of the folder information received in step S501. When it is determined that the request is a local request (YES in step S508), the processing advances to step S510. When it is determined that the request is from the network (NO in step S508), the processing proceeds to step S509.

The determination in step S508 is made by determining whether the request is from the operation unit 106 or from another device on the network (that is, determining the request source). In place of making such a determination, the determination in step S508 may be made by identifying a communication protocol under which the request is made. For example, when the request of the folder information is received with a hypertext transfer protocol (HTTP), the determination may be NO in step S508. And when the request of the folder information is received under a protocol other than the HTTP, the determination may be YES in step S508.

In step S509, the data access processing section 204 obtains the user name included in the request of the folder information, and selects only the folder information in which the access authority described in the ACL is set to the obtained user name. The application 213 displays the folder information of the selected user name on the operation unit 106. The user having the administrator authority can access folders of all users, regardless of whether the access authority is set in the ACL. However, in the case of the local access request for the folder information, only the folder of the user is displayed.

In step S510, the data access processing section 204 obtains the folder information of all users from the storage device 215 (HDD 104), independently of the user name included in the request of the folder information received in step S501, and generates a list of the folder information of all users. The data access processing section 204 sends back the generated list of information to the request source, and the user I/F control unit 209 displays the list of the folder information on the operation unit 106. The folder information of all users is displayed in step S510 because, when the access request of the user having the administrator authority is received from network, the administrator authority (authority accessible to folders of all users) is used, instead of the description of the ACL.

In step S509, control is performed to select the folder information of the user to which the access authority is set and display the selected folder information. Alternatively, in place of switching the display depending on the setting or non-setting of the access authority, the display of the folder may be switched by another method. For example, if a layer structure of the folders is classified depending on users, when the user name included in the request of the received folder information matches the file name included in the designated folder or the folder name, only the folder of the matching name may be displayed as the folder information of the requesting user. Further, as another method, the folder information of the requesting user may be displayed based on a folder creator or another setting made to the folder.

In step S509, the same processing is performed both when the requesting user of the folder information does not have the administrator authority (NO in step S507) and when the requesting user of the folder information has the administrator authority and the request is a local access request (YES in step S507). Alternatively, individual processing may be performed depending on the results in step S507.

In step S510, the folder information of all users is displayed in addition to the folder information of the user who requests the folder information. Alternatively, the folder information of all users is not displayed, but only specific folder information may be displayed. For example, if authority for deleting the folder is set as the administrator authority, only a deletable folder may be displayed. More specifically, only folder information operable under the administrator authority may be displayed.

The display switching in the case where the designated users folder is a users folder, is described with reference to the flowchart in FIG. 5 for convenience of explanation. Alternatively, the display may be switched also in the case of the folder other than the users folder depending on the request source and the setting or non-setting of the administrator authority.

FIGS. 6A to 6D illustrate examples of a display screen on the operation unit 106 or the display device 3 according to a response result to the request of the folder information.

Figure 6A:
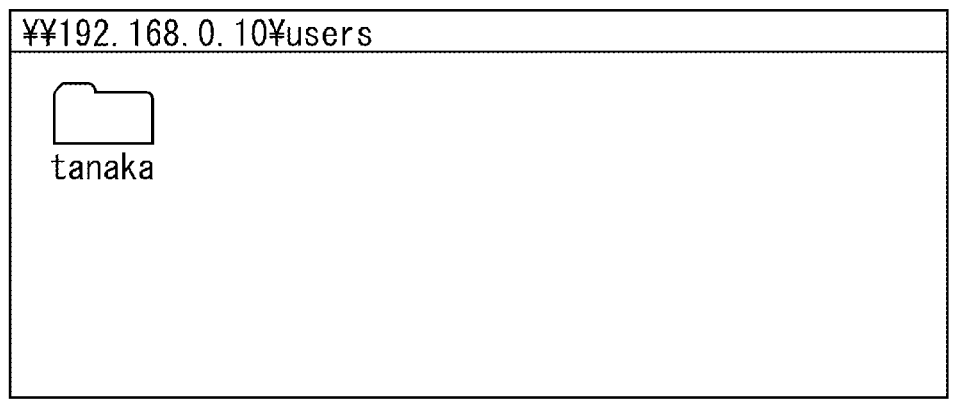

FIG. 6A illustrates an example of the operation screen displayed on the display device 3 in the external device 2 when the general user tanaka obtains a list of the users folder via the network from the external device 2 with the SMB. In this case, the list of folder is requested from the network, and the administrator authority is not set. Therefore, only the tanaka folder is displayed. A folder of another user to which the access authority is not set, is not displayed to the general user tanaka.

Figure 6B:
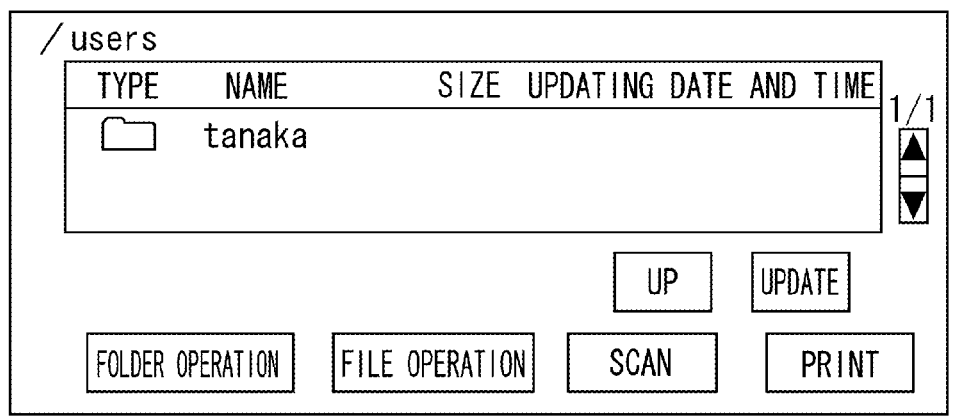

FIG. 6B illustrates an example of the operation screen displayed on the operation unit 106 when the general user tanaka obtains the list of users folder from the operation unit 106. In this case, the list of folder is requested locally (so not via a network), and the administrator authority is not set. Therefore similarly, only the tanaka folder is displayed.

FIG. 6C illustrates an example of the displayed operation screen on the display device 3 in the external device 2 when the list of users folder is obtained via the network from the external device 2 with the SMB by the user yamada having the administrator authority. In this case, the administrator authority is set and the folders of all users are displayed independently whether the access authority is set to the folder stored just under the users folder. The displayed folders can be accessed. More specifically, in a case of operation on the network, the operation possible only for the user having administrator authority, e.g., deletion of the file included in the designated folder can be performed in an environment where the operability is higher than that obtained in the operation unit 106 of the data processing apparatus 1.

FIG. 6D illustrates an example of the operation screen displayed on the operation unit 106 when the list of users folder is obtained from the operation unit 106 by the user yamada having the administrator authority. In this case, although the administrator authority is set, the list of folder is requested locally (so in a local access request). As a consequence, only the folder yamada is displayed. When the user having the administrator authority operates the operation unit 106 in the data processing apparatus 1, it becomes easier to use the print and scanner functions as main functions of the data processing apparatus 1 without viewing a folder of another user. As its effect, it is also prevented to carelessly operate a folder of another user.

Further, when executing an administrator operation (e.g., an operation for virus check or restoring of a damaged file), in many cases an application capable of realizing the administrator operation is loaded to an external device. Even if a folder or file of another user is displayed, the administrator operation is not usefully performed on the operation unit 106. Accordingly, as its effect, a file which the administrator cannot usefully operate is not displayed, which improves the operability on the operation unit 106 in the data processing apparatus 1.

The example in FIG. 6D illustrates the display of only the folder of the user yamada having the administrator authority. Alternatively, if the folder yamada is displayed being distinguished from other folders or the folder yamada is preferentially displayed compared to other folders, both the folder yamada and a folder of another user may be displayed.

According to the present exemplary embodiment, when the folder information is requested in response to the access request from network, the display device 3 displays the folder information. When a screen region of the display device 3 is wider than that of the operation unit 106, even if a folder of another user is displayed, the operability does not deteriorate.

According to the present exemplary embodiment, as illustrated in the operation screen in FIG. 6D, a scan button or a print button is displayed. When the scanned image is stored in user's own folder or a document in user's own folder is printed, a folder of another user is not displayed. Therefore, user's own folder is immediately searched and a user interface showing high operability can be achieved.

Figure 7:
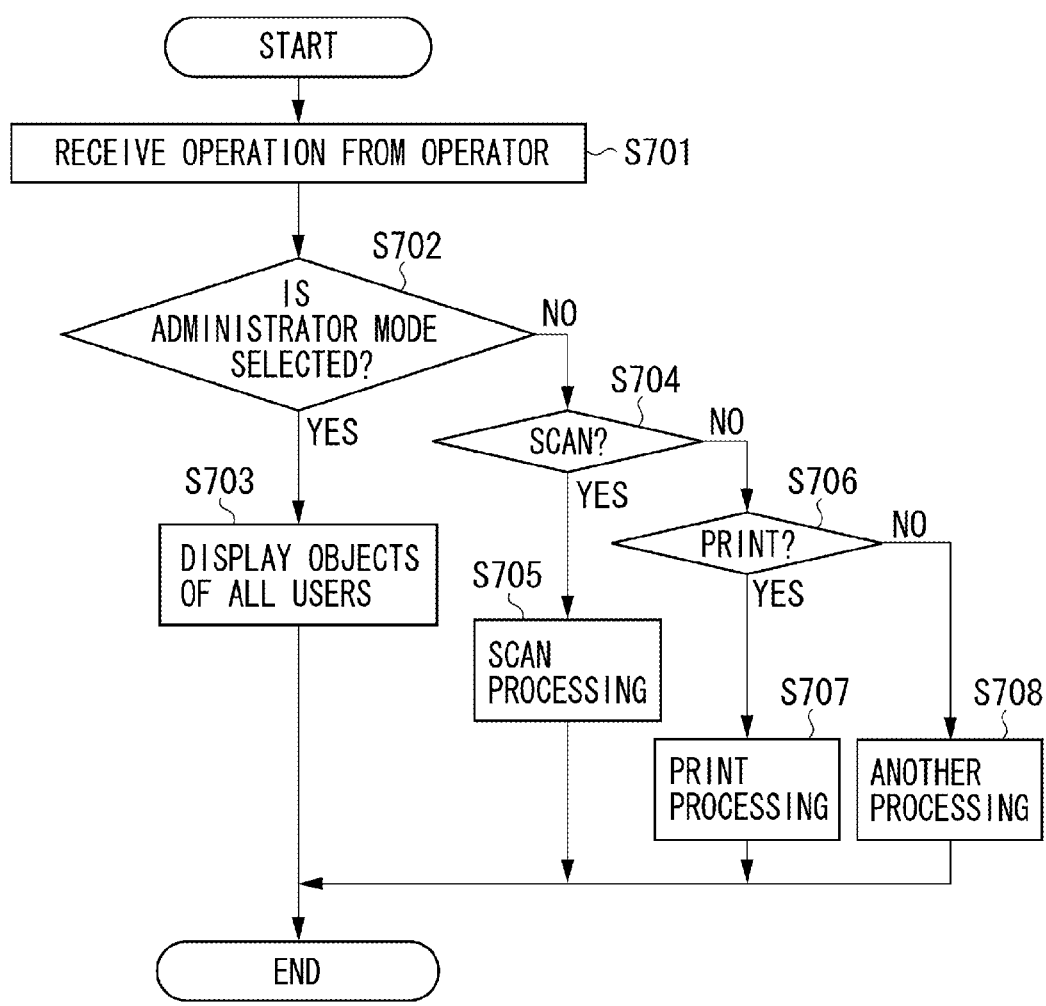
FIG. 7 illustrates a flowchart of processing in response to an operation received via the operation screen in the data processing apparatus according to the first exemplary embodiment.

FIG. 7 illustrates a flowchart of processing starting after displaying the operation screen in FIG. 6D in the data processing apparatus 1. A program for executing steps in the flowchart is stored in the HDD 104 or the ROM 103 of the data processing apparatus 1. Further, the program is stored in the RAM 102, and is executed by the CPU 101.

In step S701, the user I/F control unit 209 receives the operation from the operator via the operation screen displayed on the operation unit 106.

In step S702, the data access processing section 204 determines, based on an instruction received from the user I/F control unit 209, whether the operator selects the administrator mode. When the data access processing section 204 determines that the operator selects the administrator mode (YES in step S702), the processing proceeds to step S703. In step S703, the application 213 that receives a reply displays the folder information of all users on an operation screen in FIG. 8 on the operation unit 106. FIG. 8 illustrates the operation screen displayed when the user yamada having the administrator authority selects the administrator mode locally (so via the operation unit 106). An administrator mode button is switched to a general-user mode button, thereby displaying the folder information other than the user yamada having the administrator authority.

In step S704, the data access processing section 204 determines whether the operator has instructed a scan operation. When the data access processing section 204 determines that the operator has instructed the scan operation (YES in step S704), in step S705, the scanner control unit 210 reads the document with the scanner 108, and performs processing for storing the image in the storage device 215. According to the present exemplary embodiment, the display of the operation screen in FIG. 6D enables selection of both a button for the scan operation by the operator and a folder for storing the image data as the file on the same operation screen. As a result, the operator having the administrator authority can easily find the folder as a target of the scan operation. Further, after selecting the folder as the operation target, the scanner 108 can perform the scan processing without shifting to another device after setting the document.

In step S706, the data access processing section 204 determines whether the operator has instructed the printing. When the data access processing section 204 determines that the operator has instructed the printing (YES in step S706), in step S707, the printer control unit 211 outputs the selected file to the printer 109 via the device I/F 107 to print an image.

When the data access processing section 204 determines that the operator does not instruct the printing (NO in step S706), in step S708, another processing is executed. Then, the processing in the flowchart in FIG. 7 ends.

In the processing in steps S702 and S703 in FIG. 7, even if the folder information is requested locally by the user having the administrator authority, the folder information of all users can be displayed by selecting the administrator mode on the operation screen displayed on the operation unit 106.

As a result, even if the communication between the network and the data processing apparatus 1 is disconnected, or even if the data processing apparatus 1 does not use the file shared protocol of the SMB, it is possible to perform maintenance of a folder of another user.

According to the present exemplary embodiment, even in (under) an environment where the network is not accessed or an environment prohibiting the sharing of file(s) even if the network can be accessed, it is possible to accomplish an operation possible only for the user having the administrator authority. Since the mode can be selected, the display can be properly switched depending on whether the user performs an operation for scanning (or print operation) or the operation such as maintenance. Further, it is possible to switch between the administrator mode for displaying the folders of all users and the general-user mode for displaying only the user's own folder. Therefore, even when the function of the data processing apparatus 1 is used, the user can easily access their own folder and the convenience does not deteriorate.

In place of using the file shared protocol of the SMB, the folder list may be obtained under a protocol of a web distributed authoring and versioning (Web DAV). Further, both functions of the SMB file shared protocol and the Web DAV protocol may be provided, and the user may designate which protocol is to be used in response to the request for the list of files.

According to the present exemplary embodiment, the folder information is displayed as an example. Alternatively, information of the file may be displayed, e.g., a file name, a file format, a creator of the file, or updating date of the file.

According to the first exemplary embodiment, only the user's own folder is displayed when the user, having the administrator authority, requests the folder list locally. Therefore, even if an operation region on the operation screen of the operation unit 106 is small, the target folder can be easily found.

Further, the user having the administrator authority can view a folder of another user who requires the maintenance as well as user's own folder displayed on the screen.

According to the second exemplary embodiment, when the user having the administrator authority requests the folder list, it is possible to display not only user's own folder but also the folder of the user who needs the maintenance.

First, a description is given of the case in which the user having the administrator authority needs the maintenance.

With respect to the display screen region, the operation unit 106 in the data processing apparatus 1 is generally smaller than the display device 3. When 10,000 files are stored in the designated folder, if only 10 files are displayed at a time on the operation unit 106, a scroll operation is needed at least 1,000 times to check all files. In other words, the operability is low. According to the present exemplary embodiment, a restriction is set to a number of files to be stored in one folder and the total number of folders. Specifically, the number of files to be stored in one folder and the total number of folders are limited to 1,000 or less.

As a result of limiting the number of files stored in one folder and the total number of folders, the following problem occurs. Namely, it is assumed that, as a regular operation, a received facsimile (FAX) document is automatically stored as an image file in a predetermined folder. When the number of files in one folder reaches an upper limit (1,000 according to the present exemplary embodiment), no more files are stored.

Therefore, when the number of files in one folder is coming close to the upper limit, the user having the administrator authority needs to notify the user having the access authority to the folder or delete some or all of the image files stored in the folder.

Therefore, according to the present exemplary embodiment, when the folder list is requested by the user having the administrator authority, the folder of the user who needs the maintenance is displayed in addition to user's own folder.

Figure 9:
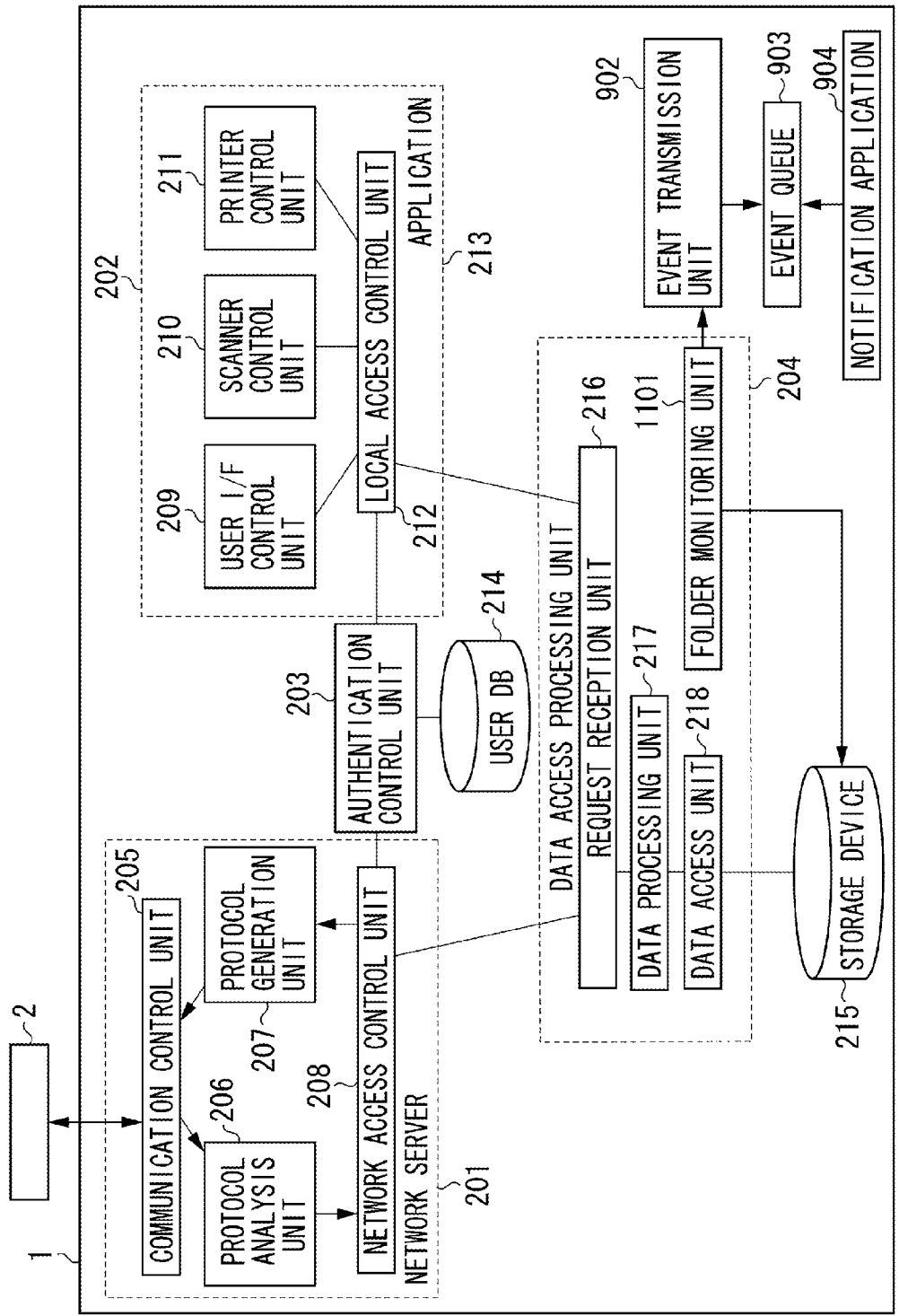
FIG. 9 illustrates a block diagram of a software configuration of a data processing apparatus according to according to the second exemplary embodiment.

A description is given of a software configuration of the data processing apparatus 1 according to the second exemplary embodiment with reference to FIG. 9. The identical reference numeral is given to the identical function unit in FIG. 2 according to the first exemplary embodiment and a description thereof is omitted. The data access processing section 204 includes a folder monitoring unit 1101. When the data access unit 218 performs processing for creating a folder or a file in the storage device 215, the folder monitoring unit 1101 monitors the number of files in the folder and the total number of folders.

When the number of files in one folder and/or the total number of folders is equal to or greater than a predetermined number, it is requested to an event transmission unit 902 to transmit an event indicating that the number of files in the folder and/or the total number of folders is a equal to or greater than the predetermined number. The event is issued under a specific condition to notify another module in the device of a state or a situation. According to the present exemplary embodiment, when 700 or 900 files are stored in one folder, the event is issued. The event transmission unit 902 transmits the event to an event queue 903.

FIGS. 10A to 10C illustrate examples of events transmitted by the event transmission unit 902. An event in FIG. 10A illustrates that the total number of files in a folder/users/suzuki/abc/xyz/ folder and folders of the user Suzuki reaches 700 on 25 May 2010, 11:25:52 (time difference is +9 hours). In the case of an event type (EVENT) 1201 in FIG. 10A, 700 files are stored in one folder. It shows that the EVENT 1201 is issued on a path 1204 of a user 1202, i.e., suzuki as a user name at an event date (date) 1203.

Similarly to FIG. 10A, FIGS. 10B and 10C illustrate attributes of event types (EVENTS) 1205 and 1209, users 1206 and 1210, dates 1207 and 1211, and paths 1208 and 1212.

Figure 11A:
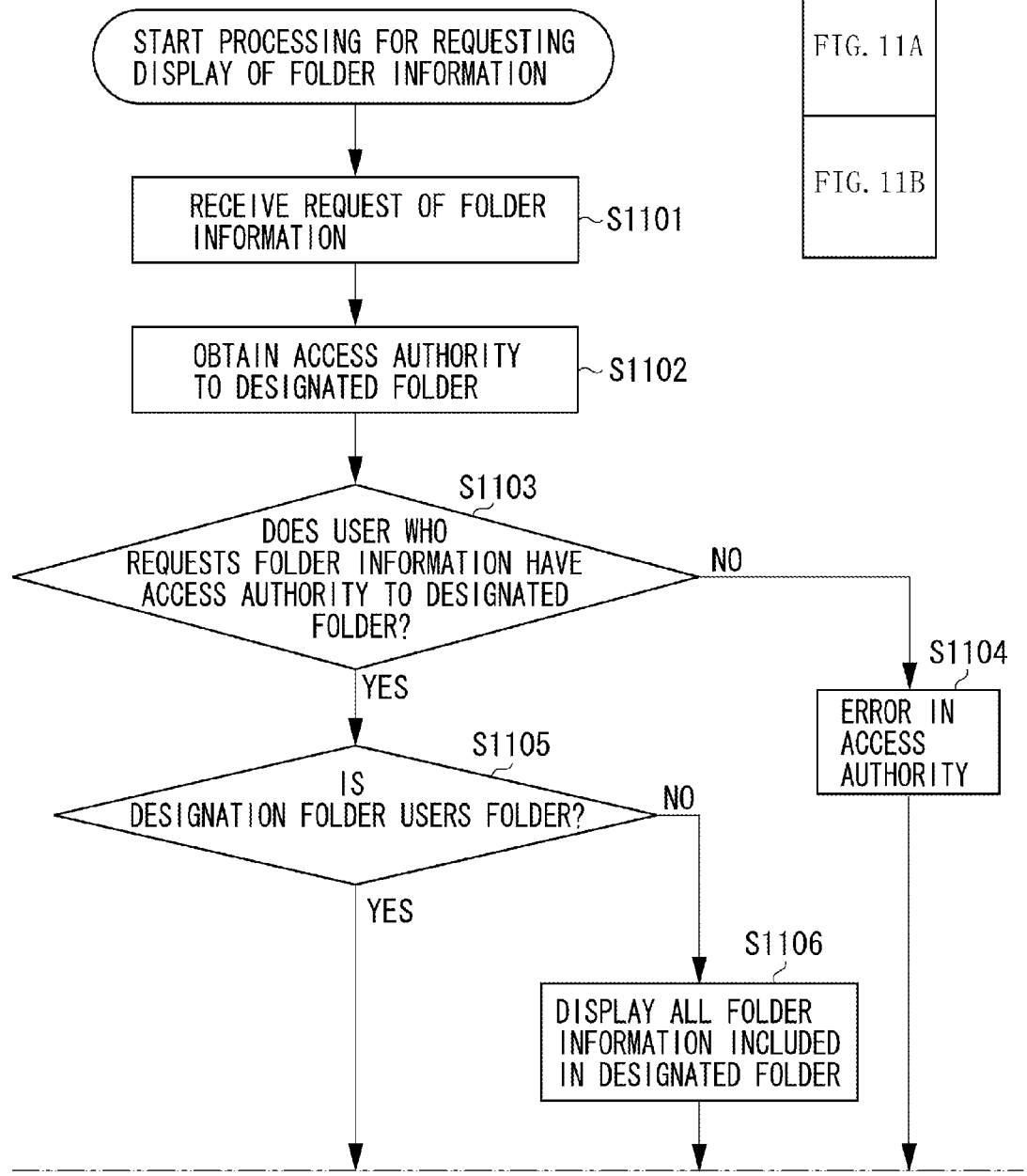
FIGS. 11A to 11B illustrate a flowchart of processing in response to a request of folder information in a data processing apparatus according to the third exemplary embodiment.
Figure 11B:
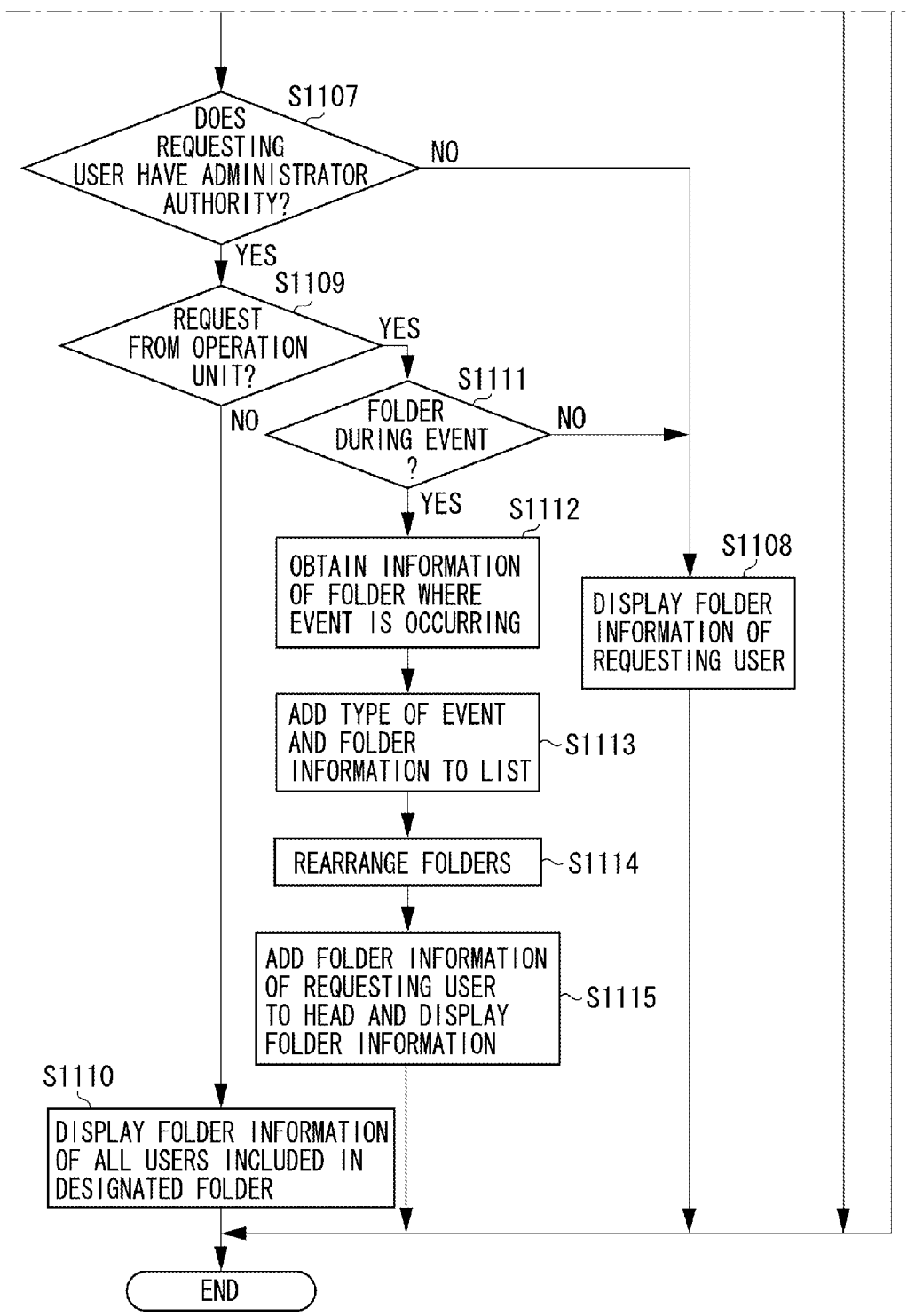

A description will now be given of the processing performed by the data processing apparatus 1 according to the second exemplary embodiment with reference to a flowchart in FIG. 11. Referring to FIG. 11, the identical reference numeral is given to a portion with the identical processing in FIG. 3. Further, the processing at the identical reference numeral is not repeated. A program for executing steps in the flowchart in FIG. 11 is stored in the HDD 104 or the ROM 103 in the data processing apparatus 1. The program is loaded to the RAM 102 and is executed by the CPU 101.

Processing in steps S1101 to S1106 is similar to that in steps S501 to S506 of FIG. 5. Thus, a description thereof is omitted.

In step S1107, the data access processing section 204 determines whether the requesting user has the administrator authority by checking the setting or non-setting of the administrator authority included in the request of the folder information received in step S1101. When the data access processing section 204 determines that the requesting user has the administrator authority (YES in step S1107), the processing proceeds to step S1109. When the data access processing section 204 determines that the requesting user does not have the administrator authority (NO in step S1107), the processing proceeds to step S1108.

In step S1108, the data access processing section 204 obtains only the folder information of the user name included in the request of the folder information. The obtained folder information is displayed on the external device 2 (so on the display 3 connected thereto) or the operation unit 106.

In step S1109, the data access processing section 204 determines whether the request is a local access request (so from the local access control unit 212) or from the network, based on information on the request source included in the request of the folder information received in step S1101. When the data access processing section 204 determines that the request is a local access request (YES in step S1109), the processing proceeds to step S1111. When the data access processing section 204 determines that the request is from the network (NO in step S1109), the processing proceeds to step S1110.

In step S1110, the data access processing section 204 obtains the folder information of all users from the storage device 215, irrespective of whether the user requests the folder information, and displays the folder list on the display device 3 connected to the external device 2.

In step S1111, the data access processing section 204 determines whether the event is in progress. Specifically, the data access processing section 204 determines whether an event is stored in the event queue 903 and checks whether there is an event when the 700 files are stored in one folder or an event when the 900 files are stored therein. When the data access processing section 204 determines that there is an event is stored in the event queue 903 (YES in step S1111), the processing proceeds to step S1112. When the data access processing section 204 determines that there is no event stored in the event queue 903 (NO in step S1111), the processing proceeds to step S1108.

In step S1112, the data access processing section 204 obtains the folder information of the user corresponding to the event determined to be in progress in step S1111.

In step S1113, the data access unit 218 adds the event type (EVENT) obtained in step S1112 and the folder information obtained in step S1112 to the folder list. Then, the data access processing section 204 determines whether there is an unprocessed (desired) event in the event queue 903. When the data access processing section 204 determines that there is an unprocessed (desired) event in the event queue 903, the data access processing section 204 obtains the next (desired) event. Then, in step S1112, the event is added to the folder list again. When the data access processing section 204 determines that there is no unprocessed desired event in the event queue 903, the processing proceeds to step S1114.

When the event occurs at a layer lower than the folder of the user as shown in the event in FIG. 10A, in step S1112, the folder of the user is obtained. More specifically, in the case of the path 1204 in FIG. 10A, /users/Suzuki is obtained as the folder of the user. When there is a plurality of events for the same user, only one folder of the user is obtained. Further, when there is a plurality of different event types (EVENTS) as to the same user, an event with higher priority is set as the event issued to the user.

The priority of the event will now be described. According to the present exemplary embodiment, the event is issued when 700 or 900 files are stored in one folder. The 900 files in one folder are closer to 1,000 files as the upper limit than the 700 files. Therefore, instead of the 700 files, the 900 files need to be processed with higher priority. Namely, the priority of the 900 files is higher than that of the 700 files. Thus, depending on the event type, the priority is set.

In step S1114, the data processing unit 217 rearranges the folders in the folder list obtained in step S1112 depending on the event type. More specifically, the event type with high priority is shifted to a high rank in the folder list.

In step S1115, the data access unit 218 obtains the folder information of the user having the administrator authority from the storage device 215, and adds the obtained folder information to the head of the folder list. If the folder information of the user having the administrator authority is already obtained in step S1002, the data access unit 218 does not additionally obtain the folder information. Then, the folder information obtained in step S1002 is shifted to the head of the folder list.

A specific description will now be given of the processing in steps S1112 to S1115 with reference to FIGS. 12A to 12E. FIGS. 12A to 12E illustrate processing for obtaining and rearranging the events in FIGS. 10A to 10C. The data access processing section 204 sequentially picks up the event from the event queue 903. First of all, the data access processing section 204 obtains the event in FIG. 10A, and determines that the number of files stored in one folder and the number of folders of the user suzuki is 700 or more. The data access processing section 204 obtains information of the /users/suzuki folder, and adds the obtained information to the information on the folder list.

As illustrated in FIG. 12A, the folder information and the event type of the user suzuki are described in the information on the folder list. Then, the data access processing section 204 obtains the event in FIG. 10B, and determines that the number of files stored in one folder and the total number of folders of the user arai is 700 or more. Since the data access processing section 204 has not obtained the folder information of the user aria yet, the data access processing section 204 obtains the folder information of the /users/arai from the storage device 215, and adds the obtained folder information together with the event type to the information on the folder list.

FIG. 12B illustrates the result of addition to the information on the folder list. Further, the data access processing section 204 obtains the event in FIG. 12C, and determines that the number of files stored in one folder and the number of folders of the user arai are 900 or more. The folder information of the user arai has been already obtained. However, since the event type in FIG. 10C has higher priority, the event type of the arai folder in the information on the folder list is rewritten to the event type having 900 files and folders which has higher priority.

FIG. 12C illustrates the resultant information on the folder list.

Since all the desired events in the event queue 903 are processed, the data processing unit 217 rearranges the generated information on the folder list according to the priority of the event type. More specifically, since the event type of the 900 files and folders has higher priority, the event type with higher priority is shifted to a higher rank in the information on the folder list.

FIG. 12D illustrates the resultant information on the folder list. Finally, the data access unit 218 obtains the folder information of the user yamada who has accessed the users folder, from the storage device 215, and adds the obtained folder information to the head of the folder information. FIG. 12E illustrates the resultant information on the folder list.

Figure 13:
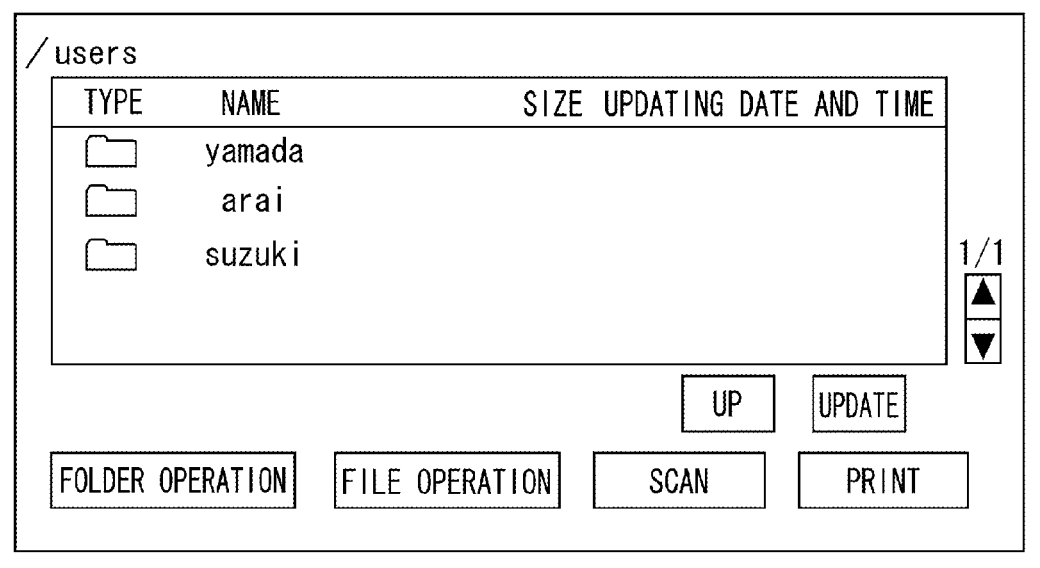

The request reception unit 216 sends back the generated information on the folder list in FIG. 12E to the application 213. The application 213 displays the folder information on the operation unit 106 based on the information on the folder list. FIG. 13 illustrates a display example on the operation unit 106.

According to the present exemplary embodiment, when the user having the administrator authority operates the data processing apparatus 1 locally (so not via a network), it is possible to view only the folder of the user who requests the folder information and the user who needs the maintenance without displaying the folders of all users. Since the arrangement of folders can be changed depending on the priority, the processing can be easily performed on the folder showing higher priority (emergency). Since user's own folder is displayed at the head while keeping the maintenance property, when the scanned image is stored in user's own folder or the document in user's own folder is printed, user's own folder can be immediately found.

According to the second exemplary embodiment, the stored files and/or folders which have exceeded a predetermined number are displayed as well as the folder of the user having the administrator authority. According to a modification example, it is possible to display the folder information (type, name, data size, and updating date) that has changed since the previous access time. In this case, the folder monitoring unit 1101 needs to monitor the change of the folder information and store the folder information in the event queue 903 when the folder information is changed.

The information on the folder list includes the event type. Therefore, when the application 213 displays the folder information on the operation unit 106 based on the information on the folder list, a display method may be changed, e.g., color is changed or a character is emphasized depending on the event type.

According to the first exemplary embodiment, a button for selecting the administrator mode may be provided on an operation screen in FIG. 13, thereby displaying the folder information of all users. When the administrator mode is selected, without displaying user's own folder information (the user yamada's folder according to the present exemplary embodiment), only folder information of another user (the user arai and the user suzuki as a maintenance target according to the present exemplary embodiment) may be displayed.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

The present invention also provides a data processing apparatus having a storage device, the data processing apparatus comprising:

a reception unit configured to receive a request for displaying a list of a plurality of objects stored in the storage device;

a user determination unit configured to determine whether the received request is made from a user capable of operating the object related to another user;

a network determination unit configured to determine whether the received request is under a network communication protocol; and a control unit configured to send back the data of the list of the plurality of objects to a device that transmits the request, when the user determination unit determines that the request is made from the user capable of operating the object related to the other user and the the network determination unit determines that the received request is under the network communication protocol, select the object related to the requesting user among the list of the plurality of objects, when the user determination unit determines that the request is from the user capable of operating the object related to the other user and the network determination unit determines that the received request is not under network communication protocol, and display a list of the selected object on an operation unit (106) in the data processing apparatus.

The present invention also provides a control method of a data processing apparatus having a storage device, the control method comprising:

receiving a request for displaying a list of a plurality of objects stored in the storage device;

determining by a user whether the received request is made from a user capable of operating the object related to another user;

determining by the network whether the received request is under a network communication protocol; and performing control to send back the data of the list of the plurality of objects to a device that transmits the request, when the user determination determines that the request is made from the user capable of operating the object related to the other user and the network determination determines that the received request is under the network communication protocol, select the object related to the requesting user among the list of the plurality of objects, when the user determination determines that the request is from the user capable of operating the object related to the other user and the network determination determines that the received request is not under the network communication protocol, and display a list of the selected object on an operation unit in the data processing apparatus.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

What is claimed is:

1. A data processing apparatus capable of communicating with an external device including a display unit via a network, the data processing apparatus comprising:
    an operation unit;
    a storage unit configured to store a file in such a manner that the file is associated with a user;
    a first reception unit configured to receive a request, transmitted by the external device based on an instruction of a first user having administrator authority, for transmitting information of a file stored in the storage unit via the network;
    a second reception unit configured to receive, based on an instruction of the first user, a request for displaying information of a file stored in the storage unit from the operation unit;
    a transmitting unit configured to transmit, based on the first reception unit receiving the request, information of a file associated with the first user and information of a file associated with a second user to the external device; and
    a control unit configured to perform control, based on the second reception unit receiving the request, to display the information of the file associated with the first user without displaying the information of the file associated with the second user on a display unit in the data processing apparatus.

2. The data processing apparatus according to claim 1, wherein the information of a file is a name of the file, a type of the file, a data size of the file, or an update date and time of the file.

3. The data processing apparatus according to claim 1, wherein the second user is a user not having the administrator authority,
    wherein the first reception unit is further configured to be capable of receiving a request, transmitted by the external device based on an instruction of the second user, -for displaying information of a file stored in the storage unit, and
    wherein, based on the first reception unit receiving the request, transmitted by the external device based on the instruction of the second user, for transmitting information of a file stored in the storage unit, the transmitting unit transmits the information of the file associated with the second user without transmitting the information of the file associated with the first user to the external device.

4. The data processing apparatus according to claim 1, further comprising a printing unit configured to perform printing of the file associated with the first user, based on the displayed information of the file associated with the first user, based on reception of a printing instruction from the first user via the operation unit.

5. The data processing apparatus according to claim 1, further comprising a reading unit configured to read a document,
    wherein, based on reception of a document reading instruction from the first user via the operation unit, image data of the document read by the reading unit is stored in the storage unit as a file in such a manner that the file is associated with the first user.

6. The data processing apparatus according to claim 1, wherein the request for displaying information of a file stored in the storage unit, which is received by the second reception unit, is a request for displaying information of a file stored in a designated folder.

7. The data processing apparatus according to claim 1, wherein the file stored in the storage unit is stored in a memory area accessible from the external device using a file sharing protocol.

8. The data processing apparatus according to claim 1, wherein the information of the file associated with the first user is displayed on the operation unit controlled by the control unit together with a button for executing a function of the data processing apparatus.

9. A control method for a data processing apparatus capable of communicating with an external device including a display unit via a network, the data processing apparatus including a storage unit configured to store a file in such a manner that the file is associated with a user, the control method comprising:
    receiving, as first receiving, a request, transmitted by the external device based on an instruction of a first user having administrator authority, for transmitting information of a file stored in the storage unit via the network;
    receiving, as second receiving, based on an instruction of the first user, a request for displaying information of a file stored in the storage unit from an operation unit included in the data processing apparatus;
    transmitting, based on reception of the request by the first receiving, information of a file associated with the first user and information of a file associated with a second user to the external device, and
    performing control, based on reception of the request by the second receiving, the operation unit to display the information of the file associated with the first user without displaying the information of the file associated with the second user on a display unit in the data processing apparatus.

10. A non-transitory recording medium storing a program for causing a computer to execute the control method according to claim 9.

11. The data processing apparatus according to claim 1, further comprising a printing unit, wherein the control unit selects, based on the instruction of the first user, a file to be printed, from the information displayed by the display unit, and controls the printing unit to print the selected file.

* * * * *